US011825339B2

(12) United States Patent
Rotaliwala (10) Patent No.: US 11,825,339 B2
(45) Date of Patent: Nov. 21, 2023

(54) ENHANCED BAND STEERING IN A WIRELESS NETWORK

(71) Applicant: ARRIS Enterprises LLC, Suwanee, GA (US)

(72) Inventor: Kirtikumar Rotaliwala, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/367,926

(22) Filed: Jul. 6, 2021

(65) Prior Publication Data

US 2022/0030462 A1    Jan. 27, 2022

Related U.S. Application Data

(60) Provisional application No. 63/054,905, filed on Jul. 22, 2020.

(51) Int. Cl.
*H04W 28/02*    (2009.01)
*H04W 76/15*    (2018.01)
*G06F 21/60*    (2013.01)
*H04L 67/303*    (2022.01)
*H04W 84/12*    (2009.01)

(52) U.S. Cl.
CPC ...... *H04W 28/0289* (2013.01); *G06F 21/602* (2013.01); *H04L 67/303* (2013.01); *H04W 28/0231* (2013.01); *H04W 76/15* (2018.02); *H04W 84/12* (2013.01)

(58) Field of Classification Search
CPC ............ H04W 28/0289; H04W 76/15; H04W 28/0231; H04W 84/12; H04W 48/18; G06F 21/602; H04L 67/303; H04L 67/562; H04L 67/56; H04L 67/306; H04L 63/0428
See application file for complete search history.

(56) References Cited

U.S. PATENT DOCUMENTS

| 10,499,282 | B1 * | 12/2019 | Kamath | H04B 1/005 |
| 2017/0111854 | A1 * | 4/2017 | Ho | H04B 7/14 |
| 2019/0191301 | A1 * | 6/2019 | Fang | H04L 9/30 |
| 2021/0120454 | A1 * | 4/2021 | Chennichetty | H04L 1/0033 |

* cited by examiner

*Primary Examiner* — Mandish K Randhawa
(74) *Attorney, Agent, or Firm* — Wenderoth, Lind & Ponack, L.L.P.

(57) ABSTRACT

An apparatus, method, and computer-readable recording medium improve band steering of client devices in a wireless network. A processor of an electronic device examines current channel noise and signal strength characteristics of available RF bands and compares these values to historical connection data stored in the gateway device and the client devices. The processor establishes a connection with the client device on the most suitable RF band, and then updates the connection data in both the gateway device and the client device.

19 Claims, 6 Drawing Sheets

Table Stored At Client's System:

| Client MAC Address | |
|---|---|
| Creation Time Of Table | |

| Channel (GHz) | History Count | Average Access Time Duration | Average Noise Value | Average Signal Strength |
|---|---|---|---|---|
| 2.4 | | | | |
| 5 | | | | |

*FIG. 4A*

Table Of Connected Clients To Gateway & Stored At Gateway:

| Client MAC Address | Channel (GHz) | History Count | Average Access Time Duration | Average Noise Value | Average Signal Strength | Start Time |
|---|---|---|---|---|---|---|
| C1_MAC | | | | | | |
| C2_MAC | | | | | | |
| C3_MAC | | | | | | |
| C4_MAC | | | | | | |
| C5_MAC | | | | | | |

ENHANCED BAND STEERING IN A WIRELESS NETWORK

TECHNICAL FIELD

The subject matter of the present disclosure relates generally to management and control of wireless devices in a wireless network.

BACKGROUND

Wireless networks using methods such as Wi-Fi protocols are commonly used to connect network devices, including gateways, routers, and access points, to end-user client devices. Today's wireless networks often operate in a multitude of RF bands, commonly 2.4 GHz and 5 GHz. The 2.4 GHz band is shared with devices not associated with wireless networking such as cordless phones and garage door openers. The 5 GHz band is newer and often less congested than the 2.4 GHz band.

Various methods exist for steering client devices to the 5 GHz band to reduce crowding on the 2.4 GHz band. Some existing methods use centralized entities and/or databases to store information regarding client device capabilities and connection conditions. However, these methods generate substantial amounts of traffic between client devices and centralized entities and/or databases. These methods are also vulnerable to failures or connection issues with the centralized entities and/or databases.

Thus, it would be advantageous and an improvement over the existing technology to steer client devices to appropriate wireless bands using connection information stored on client devices themselves and without being dependent on the use of the centralized entities and/or databases.

SUMMARY

An aspect of the present disclosure provides an electronic device for band steering in a wireless network. The wireless network is configured to communicatively interconnect the electronic device and one or more client devices. In this aspect of the present disclosure, the electronic device includes a processor, a non-transitory memory storing a program, and a communication interface configured to establish communication connections with the one or more client devices via the wireless network on a first RF band and a second RF band. Additionally, the first band is a 2.4 GHZ band and the second band is a 5 GHZ band.

The processor is configured to execute the program to receive a request from a client device to connect to the wireless network; determine whether the request includes a connection history table for the client device; steer the client device to a first band implemented on the wireless network when it is determined that the request does not include the connection history table; and steer the client device to either the first band or a second band implemented on the wireless network when it is determined that the request includes the connection history table. The steering to either the first band or the second band is performed using connection data included in the connection history table. The connection history table includes connection data such as channel information, a history count, access time duration, noise values, and signal strength of the client device.

In an aspect of the present disclosure, the processor steers the client device to either the first band or the second band. The processor determines whether congestion on the second band exceeds a predetermined threshold, and determines whether the connection data indicates a client profile closer to the first band or the second band. The client user profile is based on the signal strength and the noise values included with the connection data.

In an aspect of the present disclosure, the processor determines a list of client devices already connected to the second band, determines whether any of client devices on the list have exceeded an average access time duration on the second band, and moves any of the client devices on the list that have exceeded the average access time duration on the second band to the first band. The processor can also steer the client device to either the first band or the second band based only the signal strength included with the connection data.

In an aspect of the present disclosure, the processor updates the client connection history table after receiving a disconnect request from the client device and after the client device disconnects from the wireless network, and encrypts the updated connection history table. The encrypted and updated connection history table is stored in the client device.

An aspect of the present disclosure provides a method for band steering in a wireless network. The wireless network is configured to communicatively interconnect an electronic device including a processor and one or more client devices on a first RF band and a second RF band. Additionally, the first band is a 2.4 GHZ band and the second band is a 5 GHZ band.

The method includes receiving, using the processor, a request from a client device to connect to the wireless network; determining, using the processor, whether the request includes a connection history table for the client device; steering, using the processor, the client device to a first band implemented on the wireless network when it is determined that the request does not include the connection history table; and steering, using the processor, the client device to either the first band or a second band implemented on the wireless network when it is determined that the request includes the connection history table. The steering to either the first band or the second band being performed using connection data included in the connection history table.

The method further includes updating, encrypting, and decrypting the connection history table using the processor.

In an aspect of the present disclosure, the steering of the client device to either the first band or the second band further comprises determining, using the processor, whether congestion on the second band exceeds a predetermined threshold; and determining, using the processor, whether the connection data indicates a client profile closer to the first band or the second band. The client user profile is based on the signal strength and the noise values included with the connection data.

In an aspect of the present disclosure, the steering of the client device to either the first band or the second band further comprises: determining, using the processor, a list of client devices already connected to the second band; determining, using the processor, whether any of client devices on the list have exceeded an average access time duration on the second band; and moving, using the processor, any of the client devices on the list that have exceeded the average access time duration on the second band to the first band. The method can also steer, using the processor, the client device to either the first band or the second band based only the signal strength included with the connection data.

An aspect of the present disclosure provides a non-transitory computer-readable recording medium for band steering in a wireless network, the wireless network configured to communicatively interconnect the electronic device and one or more client devices. The non-transitory computer-readable recording medium stores one or more programs which when executed by a processor of the electronic device performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
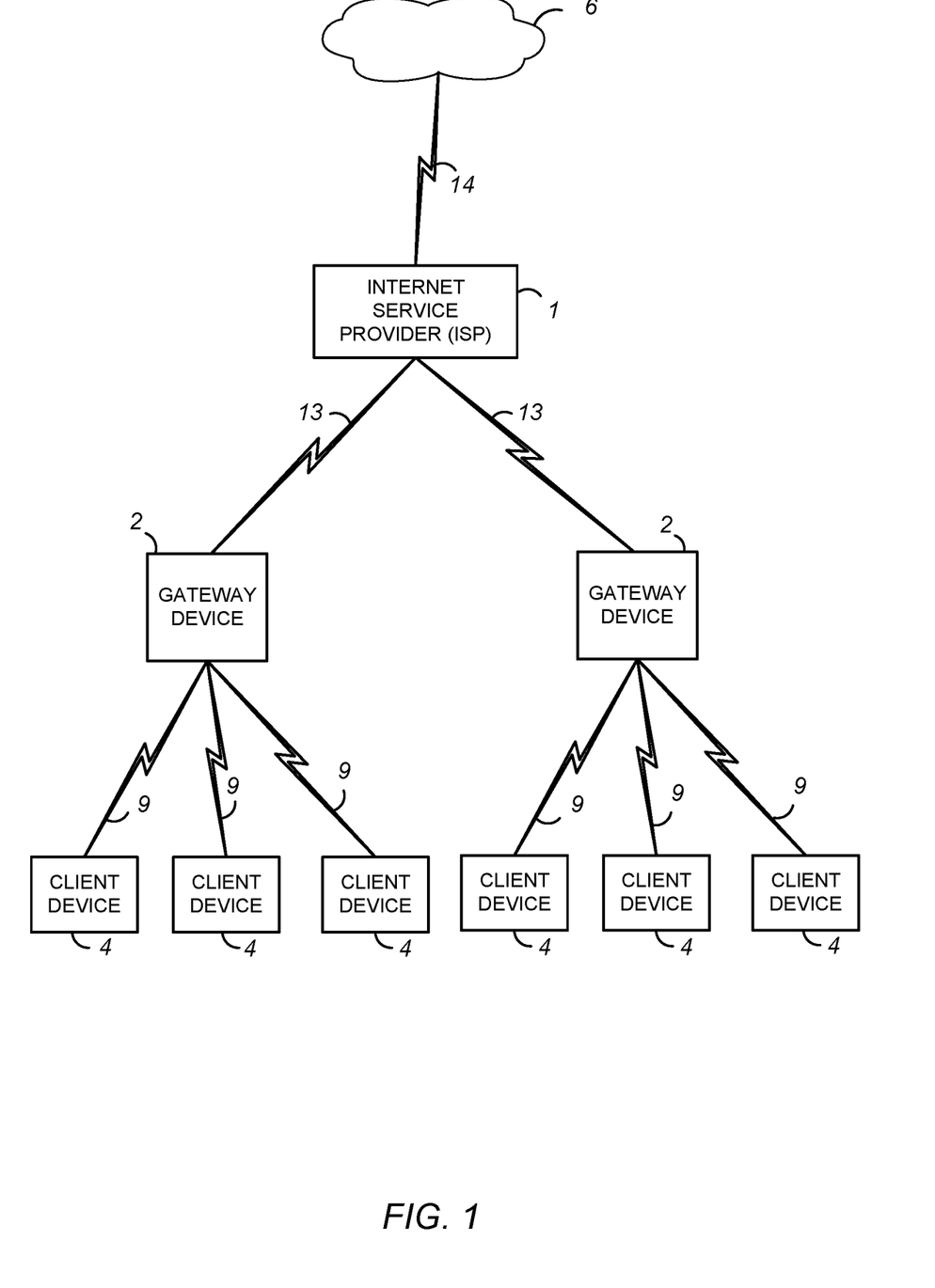
FIG. 1 is a schematic diagram of a system according to an embodiment of the present disclosure.

FIG. 1 is a schematic diagram of a system according to an embodiment of the present disclosure. As shown in FIG. 1, the main elements of the system include one or more gateway devices 2 connected to the Internet 6 via an Internet Service Provider (ISP) 1. As shown, the gateway devices 2 are also connected to one or more client devices 4. The system shown in FIG. 1 includes wireless devices (e.g., client devices 4) that may be connected in one or more wireless networks (e.g., private, guest, iControl, backhaul network, or Internet of things (IoT) network) within the system. Additionally, there could be some overlap between wireless devices (e.g., client devices 4) in the different networks. That is, one or more network devices could be located in more than one network. For example, one or more client devices 4 could be located in both a private network for providing content and information and also included in a backhaul network or an iControl network.

The ISP 1 can be, for example, a streaming video provider or any computer for connecting the gateway device 2 to the Internet 6. The connection 14 between the Internet 6 and the ISP 1 and the connection 13 between the ISP 1 and the gateway device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE) or 5G protocols.

The gateway device 2 can be, for example, a hardware electronic device that may be a combination modem and gateway device that combines the functions of a modem, an access point, and/or a router for providing content received from the ISP 1 to client devices 4 in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connections 9 between the gateway devices 2 and the client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The client devices 4 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices 4 can be a TV, an IP/QAM STB or an SMD that is capable of decoding audio/video content, and playing over OTT or MSO provided content received through the gateway device 2.

Figure 2:
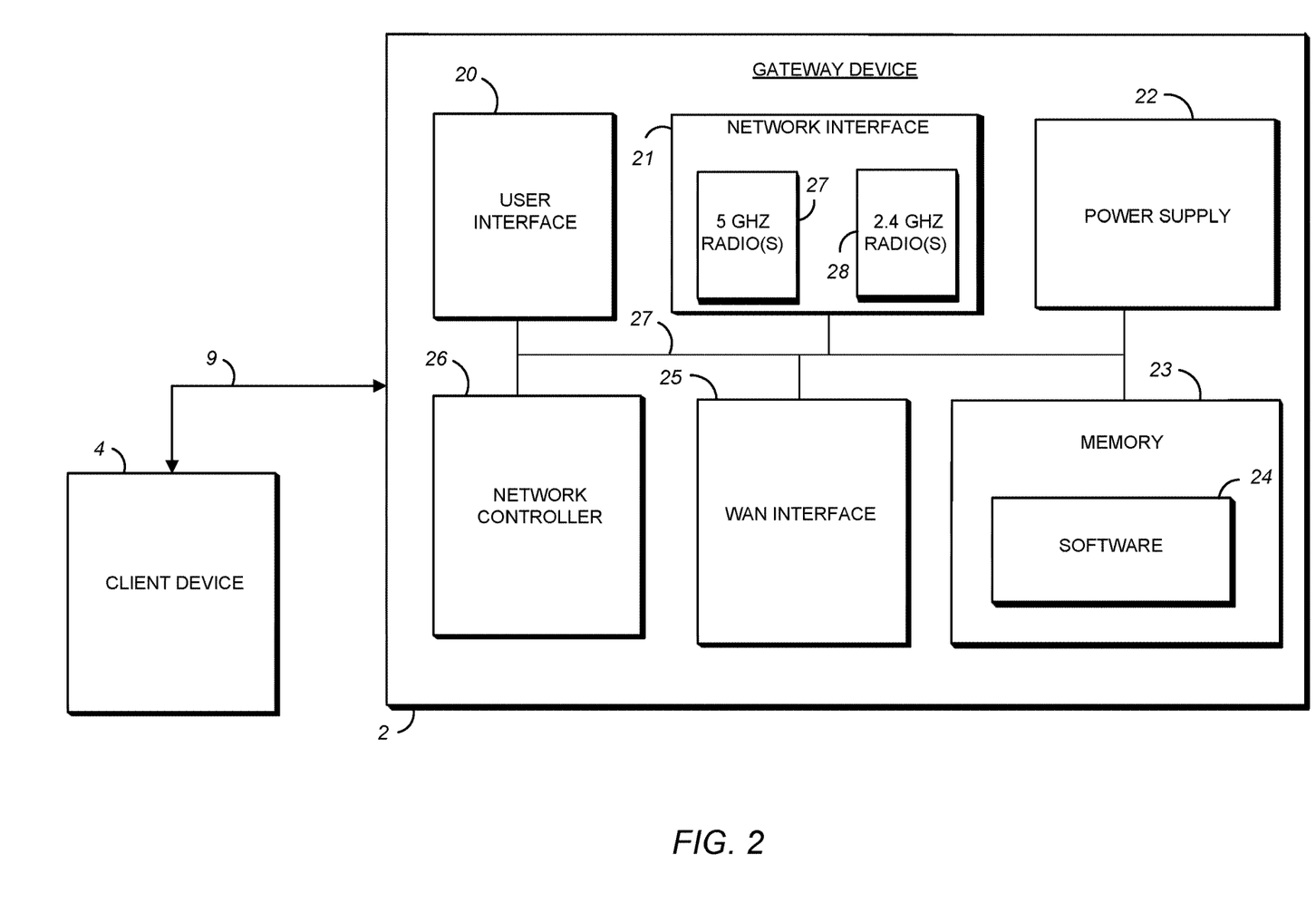
FIG. 2 is a more detailed schematic diagram of an exemplary gateway device implemented in the system of FIG. 1 according to an embodiment of the present disclosure.
Figure 3:
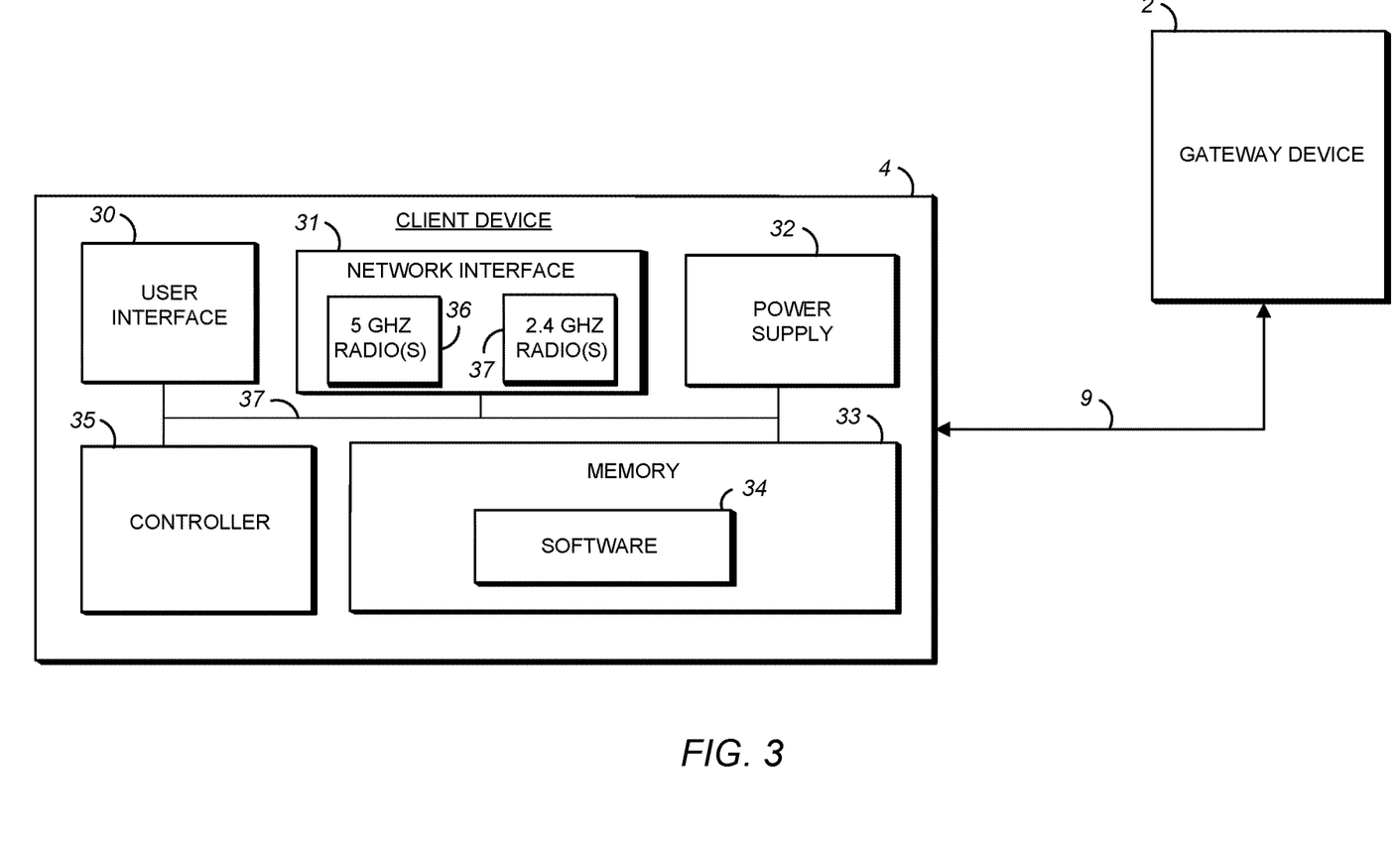
FIG. 3 is a more detailed schematic diagram of an exemplary client device implemented in the system of FIG. 1 according to an embodiment of the present disclosure.

A detailed description of the exemplary internal components of the gateway devices 2 and the client devices 4 shown in FIG. 1 will be provided in the discussion of FIGS. 2 and 3, respectively. However, in general, it is contemplated by the present disclosure that the gateway devices 2 and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the gateway devices 2 and the client devices 4 may be adapted to execute any operating system, including Linux, UNIX, Windows, MacOS, DOS, and Chrome OS as well as virtual machines adapted to virtualize execution of a particular operating system, including customized and proprietary operating systems. The gateway devices 2 and the client devices 4 are further equipped with components to facilitate communication with other computing devices over the one or more network connections to local and wide area networks, wireless and wired networks, public and private networks, and any other communication network enabling communication in the system.

In operation, the client devices 4 may power on or off, or may physically move over time, therefore connecting and disconnecting with the gateway devices 2 over the connections 9. The connections 9 may employ multiple RF bands, e.g. 2.4 GHz and 5 GHz. When the client device 4 connects to the gateway device 2, the client device 4 and the gateway device 2 negotiate which RF band to use. Older client devices 4 can only support the 2.4 GHz band, while newer client devices 4 can support both 2.4 GHz and 5 GHz bands. Thus, the gateway device 2 tries to allocate older client devices 4 to the 2.4 GHz band and steer newer client devices 4 to the 5 GHz band, which is often less crowded.

Prior-art methods of steering the client devices 4 to different RF bands often maintain a connection table that tracks connection data for multiple client devices 4. Because the client device 4 may connect to different gateway devices 2 over time (e.g., when a laptop computer is carried from one part of an office to another), the connection table is commonly stored in a centralized location (e.g., a separate centralized entity or database) so that it is accessible to all gateway devices 2. However, these methods generate substantial amounts of traffic between the client devices 4 and the centralized connection table. These methods are also vulnerable to failures or connectivity issues with the centralized connection table.

Aspects of the present disclosure provide for establishing and maintaining connection tables in the gateway device 2 and the client device 4 to improve band steering, and will now be discussed with reference to FIGS. 2-6.

FIG. 2 is a more detailed schematic diagram of an exemplary gateway device 2 implemented in the system of FIG. 1 according to an embodiment of the present disclosure. Although FIG. 2 only shows one gateway device 2, the gateway device 2 shown in the figure is meant to be representative of the other gateway devices 2 shown in FIG. 1. Similarly, the connection 9 between the gateway device 2 and the client device 4 shown in FIG. 2 is meant to be an exemplary connection and is not meant to indicate all possible connections between the gateway device 2 and the client device 4. Additionally, it is contemplated by the present disclosure that the number of gateway devices 2 and client devices 4 is not limited to the number of gateway devices 2 and client devices 4 shown in FIGS. 1 and 2.

As shown in FIG. 2, the gateway device 2 includes a user interface 20, a network interface 21, a power supply 22, a memory 23, a WAN interface 25, and a network controller 26. The user interface 20 can include, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the gateway device 2. The network interface 21 may include various network cards, and circuitry implemented in software and/or hardware to enable communications with the client device 4 using communications protocols in accordance with connection 9, as described with reference to FIG. 1. The network interface 21 also includes one or more 2.4 GHz radios 28 and one or more 5 GHz radios 27 (e.g., wireless LAN interfaces). The gateway device 2 may communicate with the local area network devices (e.g., the client devices 4) of the system via one or more of the 2.4 GHz radios 28 and/or the one or more 5 GHz radios 27. However, some other example embodiments of inventive concepts of the present disclosure are not limited to these interfaces only (e.g., the techniques may be applied with a 6 GHz radio or other similar future developed technologies). According to aspects of the present disclosure, one radio or set of radios can provide a backhaul (BH) connection between the gateway device 2 and the client devices 4, while another radio or set of radios can provide a fronthaul (FH) connection between the gateway device 2 and the client device(s) 4.

The power supply 22 supplies power to the internal components of the gateway device 2 through the internal bus 27. The power supply 22 can be a self-contained power source such as a battery pack with an interface to be powered through an electrical charger connected to an outlet (e.g., either directly or by way of another device) via a cable or wire. The WAN interface 25 may include various network cards and circuitry implemented in software and/or hardware to enable communications between the gateway device 2 and the ISP 1 using communications protocols in accordance with connection 13, as described with reference to FIG. 1.

The memory 23 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 23 can be used to store any type of instructions, software, or algorithm including software 24 for controlling the general functions and operations of the gateway device 2 and performing management functions related to the other devices (e.g., client devices 4) in the network in accordance with the embodiments described in the present disclosure. The memory 24 can also store one or more tables 50 of connected devices as shown in FIG. 4B.

The network controller 26 controls the general operations of the gateway device 2 as well as performs management functions related to the other devices (e.g., client device 4) in the network. The network controller can include, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 2 in accordance with the embodiments described in the present disclosure. Communication between the components (e.g., 20-23, 25, and 26) of the gateway device 2 may be established using the internal bus 27.

FIG. 3 is a more detailed schematic diagram of an exemplary client device 4 implemented in the system of FIG. 1 according to an embodiment of the present disclosure. Although FIG. 3 only shows one client device 4, the client device 4 shown in the figure is meant to be representative of the other client devices 4 shown in FIG. 1. Similarly, the connection 9 between the gateway device 2 and the client device 4 shown in FIG. 3 is meant to be an exemplary connection and is not meant to indicate all possible connections between the gateway device 2 and the client device 4. Additionally, it is contemplated by the present disclosure that the number of gateway devices 2 and client devices 4 is not limited to the number of gateway devices 2 and client devices 4 shown in FIGS. 1 and 3.

The client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the gateway device 2. Additionally, the client device 4 can be a TV, an IP/QAM STB, or an SMD that is capable of decoding audio/video content, and playing over OTT or MSO provided content received through the gateway device 2.

As shown in FIG. 3, the client device 4 includes a user interface 30, a network interface 31, a power supply 32, a memory 33, and a controller 35. The user interface 30 can include, but is not limited to, push buttons, a keyboard, a keypad, an LCD, a TFT, an LED, an HD or other similar display device including a display device having touch screen capabilities so as to allow interaction between a user and the client device 4. The network interface 31 can include, but is not limited to, various network cards, interfaces, and circuitry implemented in software and/or hardware to enable communications with the gateway device 2 and the client device 4 using communications protocols in accordance with connection 9, as described with reference to FIG. 1. The network interface 31 also includes one or more 2.4 GHz radios 37 and one or more 5 GHz radios 36 (e.g., wireless LAN interfaces). The client device 4 may communicate with the gateway device 2 and other local area network devices (e.g., the client devices 4) of the system via one or more of the 2.4 GHz radios 37 and/or the one or more 5 GHz radios 36. However, some other example embodiments of inventive concepts of the present disclosure are not limited to these interfaces only (e.g., the techniques may be applied with a 6 GHz radio or other similar future developed technologies).

The power supply 32 can be a self-contained power source such as a battery pack with an interface to be powered through an electrical charger connected to an outlet (e.g., either directly or by way of another device). The power supply 32 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 33 includes a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 33 can be used to store any type of instructions, software, or algorithms, including software 34, for controlling the general function and operations of the client device 4 in accordance with the embodiments described in the present disclosure. The memory 33 can also store one or more client history tables 40 as shown in FIG. 4A.

The controller 35 controls the general operations of the client device 4 and includes, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the client device 4 in accordance with the embodiments described in the present disclosure. Communication between the components (e.g., 30-33 and 35) of the client device 4 may be established using an internal bus 37.

Figure 4A:
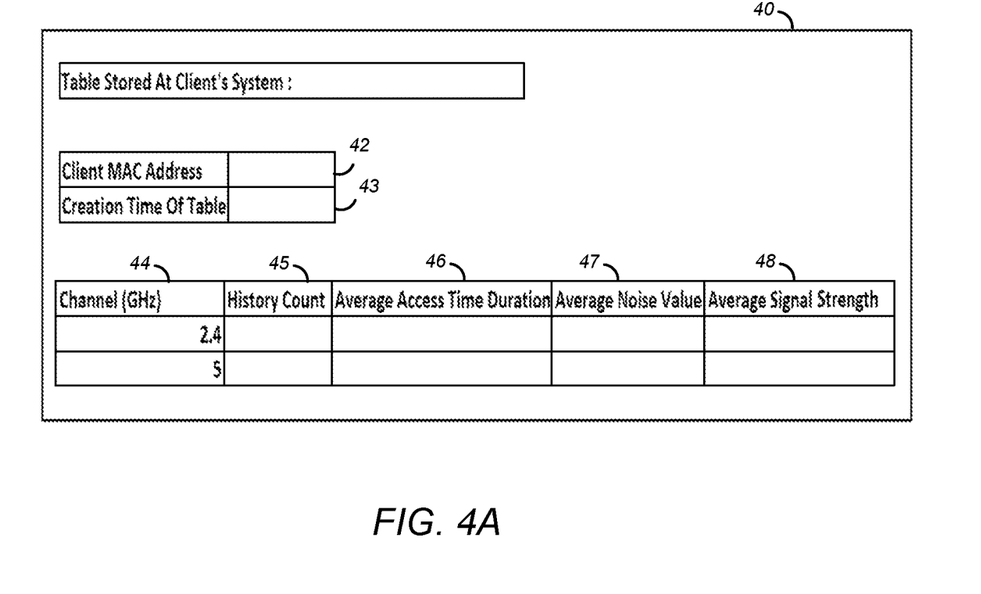
FIG. 4A illustrates a connection history table that is stored at a client device according to an embodiment of the present disclosure.
Figure 4B:
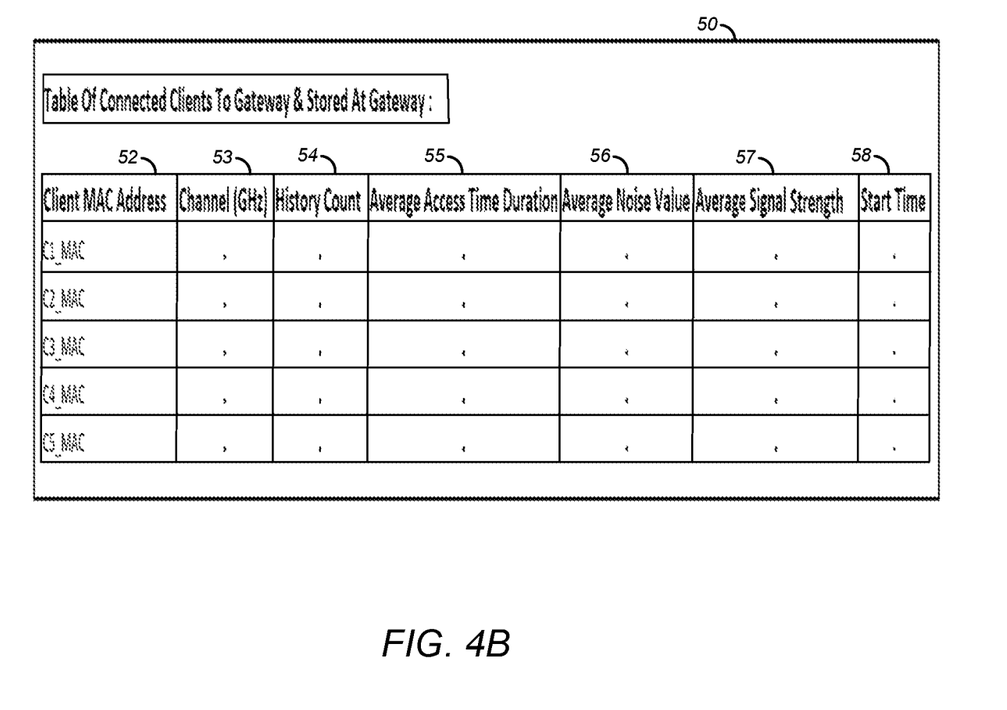
FIG. 4B illustrates a client connection table that is stored at a gateway device according to an embodiment of the present disclosure.

FIG. 4A illustrates a connection history table 40 according to an embodiment of the present disclosure. The connection history table 40 is encrypted and stored in the client device 4.

As shown in FIG. 4A, the connection history table 40 contains data fields which include a client MAC address 42, a creation time of table 43, channel 44, history count 45, average access time duration 46, average noise value 47, and average signal strength 48. The connection history table 40 is meant to be an exemplary table and is not meant to indicate all possible data fields included in this table.

The client MAC address 42 is the physical address of the client device 4. The creation time of table 43 indicates when the connection history table 40 was created. Channel 44 enumerates the RF bands (e.g., 2.4 GHz or 5 GHz) that are supported by the client device 4. History count 45 describes how many times the client device 4 has connected on each RF band. Average access time duration 46 describes the average time that the client device 4 is connected over each RF band. Average noise value 47 describes the average channel noise for each RF band from the creation time of the table 40 (e.g., in decibels (dB) or decibel-milliwatts (dBm)). Average signal strength 48 describes the average signal strength for each RF band starting from the creation time of the connection history table 40 (e.g., in decibel-milliwatts (dBm)). Data fields 45 to 48 can be reset to default values or updated whenever the connection history table 40 is created or updated after a connection to and/or disconnection from an RF band. It is contemplated by the present disclosure that the connection history table 40 is encrypted by the gateway device 2 using an encryption algorithm stored in the memory 23 of the gateway device 2. The encryption algorithm includes, but is not limited to, a symmetric or asymmetric encryption algorithm. The connection history table 40 is encrypted and decrypted by the gateway device 2, but stored in the client device 4.

FIG. 4B illustrates a client connection table 50 according to an embodiment of the present disclosure. The client connection table 50 is stored in the gateway device 2. It is contemplated by the present disclosure that the client connection table 50 can also be encrypted and decrypted by the gateway device 2 using an encryption algorithm stored in the memory 23 of the gateway device 2.

As shown in the figure, the client connection table 50 contains data fields which include client MAC addresses 52, channel 53, history count 54, average access time duration 55, average noise value 56, average signal strength 57, and start time 58. The client connection table 50 is meant to be an exemplary table and is not meant to indicate all possible data fields included in this table.

Client MAC addresses 52 enumerates the client devices 4 which are or have been connected to the gateway device 2. Channel 53 describes the RF bands (e.g., 2.4 GHz or 5 GHz) that are used by each listed client devices 4. History count 54 describes how many times each listed client device 4 has connected to the gateway device 2. Average access time duration 55 describes the average time that each listed client device 4 is connected to the gateway device 2. Average noise value 56 describes the average channel noise for each listed client device 4 (e.g., in decibels (dB)). Average signal strength 57 describes the average signal strength for each listed client device 4 (e.g., in decibel-milliwatts (dBM)) and start time 58 indicates when each client device 4 established a connection to the gateway device 2.

Figure 5:
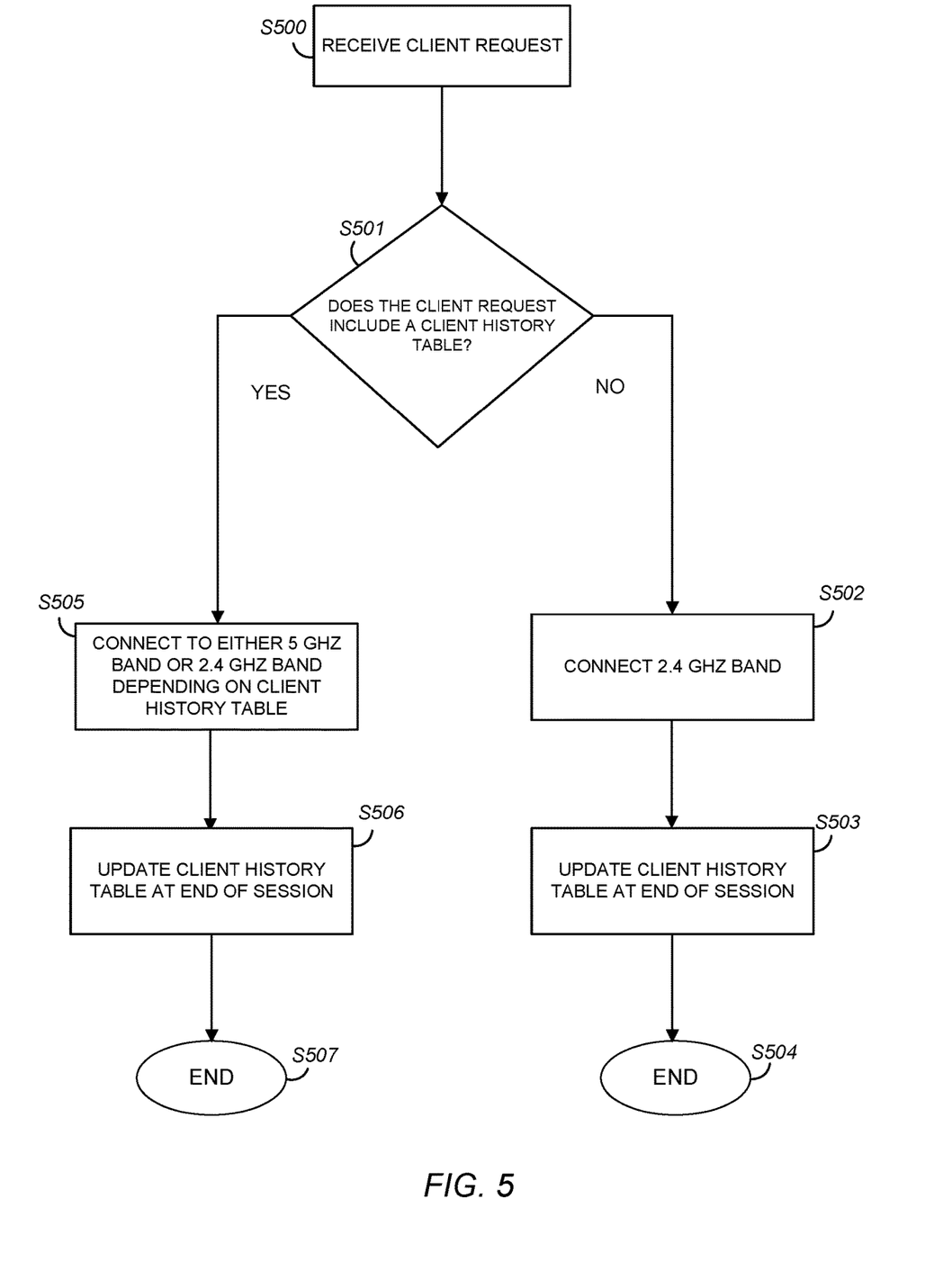
FIG. 5 illustrates a method and algorithm for steering a client device to connect to a particular band in a wireless network according to an embodiment of the present disclosure.

FIG. 5 illustrates a method and algorithm for steering a client device to connect to a particular band in a wireless network according to an embodiment of the present disclosure. In FIG. 5, it is assumed that the gateway device 2 and the client device 4 include their respective software 24 and 34 stored in their respective memories 23 and 33 which, when executed by their respective controllers 26 and 35, perform the functions and operations in accordance with the embodiments described in the present disclosure.

In step S500, the gateway device 2 receives a request from the client device 4 to establish a wireless connection over the connection 9.

In step S501, the gateway device 2 determines whether the request includes the connection history table 40. That is, when the client device 4 transmits a request for connection to the network, the connection history table 40, if stored in the client device 4, would be included with the request. Upon receipt of the request, the network controller 26 executes the software 24 stored in the memory 23 to determine whether the transmission received (e.g., request) from the client device 4 includes the connection history table 40. If the connection history table 40 is included with the request from the client device 4, then the software 24 proceeds to step S505. If the connection history table 40 is not included with the request, then the software 24 proceeds to step S502.

In step S502, the client device 4 connects to the gateway device 2 using the 2.4 GHz band on the connection 9, as the connection history table 40 has not been provided in the received request. At the end of the connection session with the client device 4, the tables 40 and 50 are updated in step S503 by the gateway device 2. For example, when the client device 4 decides to disconnect from the 2.4 GHz band, the client device 4 sends a disconnect request to the gateway device 2. After the client device 4 disconnects from the wireless network, the gateway device 2 updates the table 40. The updated table 40 is encrypted by the gateway device 2 and stored in the memory 33 of the client device 4, and the method ends in step S504.

If in step S501 the connection history table 40 is provided with the request, then the RF band of the connection 9 is chosen in step S505. For example, the network controller 26 executes the software 24 stored in the memory 23 and determines, based on data fields contained in the connection history table 40, whether the client device 4 should be connected over the 2.4 GHz band or over the 5 GHz band of the connection 9. During a hand-shake operation between the gateway 2 and the client device 4, the gateway device 2 receives signals from client device 4. Based on this operation, the gateway 2 will examine the quality of received signal from client device 4 based on, for example, two parameters including current signal strength and current noise values. By examining these parameters, the capacity of client device 4 for receiving and sending of the signals to/from gateway 2 on different bands can be determined. This process will be discussed in further detail with reference to FIG. 6. At the end of the connection session with the client device 4, the tables 40 and 50 are updated in step S506 by the gateway device 2. For example, when the client device 4 decides to disconnect from the 2.4 GHz band or the 5. GHz band, the client device 4 sends a disconnect request to the gateway device 2. After the client device 4 disconnects from the wireless network, the gateway device 2 updates the tables 40 and 50. The updated table 40 is encrypted by the gateway device 2 and stored in the memory 33 of the client device 4, and the method ends in step S507.

Figure 6:
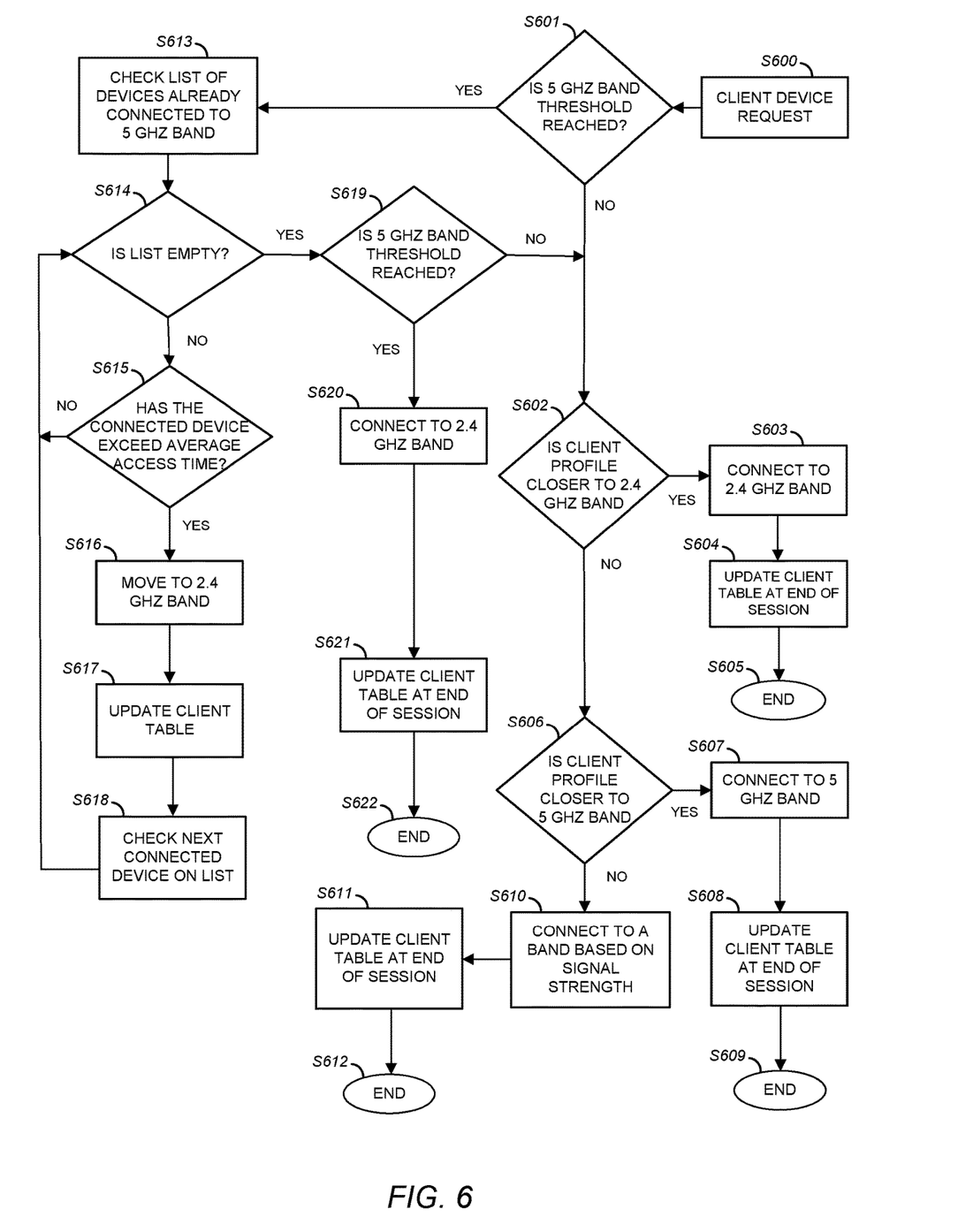
FIG. 6 illustrates details of a method and algorithm for steering a client device to connect to a particular band in a wireless network according to an embodiment of the present disclosure.

FIG. 6 illustrates in more detail the method and algorithm for steering a client device to connect to a particular band in a wireless network according to an embodiment of the present disclosure. The method and algorithm illustrated in FIG. 6 correspond to a more detailed description of steps S505 and S506 in FIG. 5. In FIG. 6, it is assumed that the gateway device 2 and the client device 4 include their respective software 24 and 34 stored in their respective memories 23 and 33 which, when executed by their respective controllers 26 and 35, perform the functions and operations in accordance with the embodiments described in the present disclosure.

In step S600, a request is received from the client device 4 by the gateway device 2. In this example, the request includes the connection history table 40 (e.g., as show in FIG. 4A) and the client device 4 is able to support both 2.4 GHz and 5 GHz bands on connection 9.

In step S601, the gateway device 2 determines whether the number of client devices 4 that are currently connected on connection 9 using the 5 GHz band (e.g., the current density) has reached a predetermined threshold density value point ($\alpha$)—e.g., $\alpha$>current device density. In this non-limiting example, $\alpha$ is set at ten client devices 4 connected to the 5 GHz band. However, it is contemplated by the present disclosure that the a can be set to any desired number of client devices 4 connected to the 5 GHz band. The network controller 26 executes the software 24 stored in the memory 23 and examines the client connection table 50 (e.g., as show in FIG. 4B) to determine the current number of client devices 4 currently using the 5 GHz band and whether the current number of client devices 4 reaches or exceeds the predetermined threshold for the 5 GHz band ($\alpha$).

If the number of client devices 4 using the 5 GHz band exceeds the predetermined threshold for the 5 GHz band ($\alpha$), then in step S613 the gateway device 2 checks the list of client devices 4 connected on the 5 GHz band. For example, the network controller 26 examines the client connection table 50. If this list is not empty in step S614, then in step S615 the gateway device 2 checks whether any of the already-connected client device 4 in the table 50 have been connected longer than the average access time duration 55—e.g., $\$(i) > ¥(i)$, where $\$(i)$=(current time of ith client device–start time of ith client device) and $¥(i)$=average access time duration of ith client device. The average access time duration of ith client device ($¥(i)$) can be a time that any one client device is allowed to be connected to the 5 GHz band (e.g., 0.5 hours, 1 hour, or 2 hours). For example, the network controller 26 calculates the connection time of the ith device in connection history table 50 and compares this connection time to the average access time duration 55. If the connection time exceeds the average access time duration 55, then in step S616 the gateway device 2 moves the already-connected client device 4 to the 2.4 GHz band. The tables 40 and 50 are updated in step S617 and the gateway device 2 proceeds to the next client device 4 listed in the connection history table 50 in step S618. Steps S615-S618 are repeated for all client devices 4 that are already connected to the gateway device 2 over the 5 GHz band; in this manner, the client devices 4 that have been connected for long durations to the gateway device 2 over the 5 GHz band are steered to the 2.4 GHz band.

In step S614, if there are no client devices 4 on the list (e.g., the list is empty) or all the client devices on list have been checked, then in step S619 the gateway device 2 again checks whether the predetermined threshold for the number of devices using the 5 GHz band ($\alpha$) has been reached—e.g., $\alpha$>current device density. If yes, then the new client device 4 that is requesting a connection is connected over the 2.4 GHz band in step S620. In this case, the tables 40 and 50 are updated in step S621 and the method ends in step S622.

If in step S619 the predetermined threshold ($\alpha$) has not been reached, then it is possible to steer the client device 4 to either the 2.4 GHz band or the 5 GHz band. Therefore, the gateway device 2 examines additional factors based on the data in the connection history table 40 included with the request. In steps S602 and S606, the gateway device 2 checks whether the client device 4's profile is more suitable for the 2.4 GHz band or the 5 GHz band, respectively, based on the data in the connection history table 40 included with the request and the signals from the client device 4. For example, during hand-shake operations between the gateway 2 and the client device 4, the gateway device 2 receives signals from client device 4. Based on this operation, the gateway device 2 will examine the quality of received signal from client device 4 based on, for example, two parameters including current signal strength and current noise values. By examining these parameters, the capacity of client device 4 for receiving and sending of the signals or data to/from gateway device 2 on different bands can be determined. The client profile can be, for example, the capacity or operating characteristics of the client device 4 based on the data in the connection history table 40 and the signals from the client device 4 for receiving and sending of signals and data to and/or from the gateway device 2.

In step S602, the network controller 26 executes the software 24 stored in the memory 23 and examines the noise values and signal strength values of the received signals from the client device 4 to the gateway device 2 and compares these values with the average noise value 56 and the average signal strength value 57 in the connection history table 40—e.g., ($\mu$>$\pi$ and €>£), where $\mu$=(current signal strength−average signal strength of 5 GHz band), $\pi$=(current signal strength−average signal strength of 2.4 GHz band), €=(current noise value−average noise value of the 5 GHz band), and £=(current noise value−average noise value of the 2.4 GHz band). If in step S602 it is determined that the client device 4's profile is more suitable for the 2.4 GHz band, then the client device 4 is connected over the 2.4 GHz band in step S603. In this case, the tables 40 and 50 are updated in step S604 and the method ends in step S605.

In step S602, if it is determined that the client device 4's profile is not more suitable for the 2.4 GHz, then in step S606, the network controller 25 determines if the client device's profile is more suitable for the 5 GHz band. The network controller 26 executes the software 24 stored in the memory 23 and examines the noise values and signal strength values of the received signals from the client device 4 to the gateway device 2 and compares these values with the average noise value 56 and the average signal strength value 57 in the connection history table 40—e.g., ($\mu$<$\pi$ and €<£). If in step S606 it is determined that the client device 4's profile is more suitable for the 5 GHz band, then the client device 4 is connected over the 5 GHz band in step S607. The tables 40 and 50 are updated in step S608 and the method ends in step S609.

However, in step S606, if it is determined that the client device 4's profile is not suitable for either the 2.4 GHz or the 5 GHz band (e.g., based on consideration of both signal strength and noise values), then in step 610 the gateway device 2 chooses the band based on the received signal strength of the signals from the client device 4 to the gateway device 2. The tables 40 and 50 are updated in step S611 and the method ends in step S612.

The following are exemplary cases of determining if a client device 4's profile is more suitable for the 2.4 GHz band or the 5 GHz band (e.g., as described in FIG. 6).

Exemplary Case 1:
   (Threshold Density Value point for 5 GHz band ($\alpha$)=200)
   Current Density of 5 GHz band=100, which is less than $\alpha$
   Average Signal Strength of 5 GHz=−55 dBm per count
   Average Signal Strength of 2.4 GHz=−80 dBm per count
   Average Noise Value of 5 GHz=−95 dBm per count
   Average Noise Value of 2.4 GHz=−50 dBm per count
   Current Signal Strength=−60 dBm
   Current Noise Value=−85 dBm
$\mu$=|Current Signal Strength−Average Signal Strength of 5 GHz|=|(−60)−(−55)|=5
$\pi$=|Current Signal Strength−Average Signal Strength of 2.4 GHz|=|(−60)−(−80)|=20
€=|Current Noise Value−Average Noise Value of 5 GHz|=|(−85)−(−95)|=10
£=|Current Noise Value−Average Noise Value of 2.4 GHz|=|(−85)−(−50)|=35
Here, 5<20, means ($\mu$<$\pi$) and 10<35, means (€<£).
The result is ($\mu$<$\pi$) && (€<£). The client device profile is suited for connection to the 5 GHz band. The client device will be connected to 5 GHz band.

Exemplary Case 2:
   (Threshold Density Value point for 5 GHz band ($\alpha$)=200)
   Current Density of 5 GHz band=100, which is less than $\alpha$
   Average Signal Strength of 5 GHz=−55 dBm per count
   Average Signal Strength of 2.4 GHz=−80 dBm per count
   Average Noise Value of 5 GHz=−95 dBm per count
   Average Noise Value of 2.4 GHz=−50 dBm per count
   Current Signal Strength=−85 dBm
   Current Noise Value=−45 dBm
$\mu$=|Current Signal Strength−Average Signal Strength of 5 GHz|=|(−85)−(−55)|=30
$\pi$=|Current Signal Strength−Average Signal Strength of 2.4 GHz|=|(−85)−(−80)|=5
€=|Current Noise Value−Average Noise Value of 5 GHz|=|(−45)−(−95)|=50
£=|Current Noise Value−Average Noise Value of 2.4 GHz|=|(−45)−(−50)|=5
Here, 30>5, means ($\mu$>$\pi$) and 50>5, means (€>£).
The result is ($\mu$>$\pi$) && (€>£). The client device profile is suited for connection to the 2.4 GHz band. The client device will be connected to 2.4 GHz band.

Exemplary Case 3:
  (Threshold Density Value point for 5 GHz band (α)=200)
  Current Density of 5 GHz band=100, which is less than a
  Average Signal Strength of 5 GHz=−55 dBm per count
  Average Signal Strength of 2.4 GHz=−80 dBm per count
  Average Noise Value of 5 GHz=−95 dBm per cnt
  Average Noise Value of 2.4 GHz=−50 dBm per count
  Current Signal Strength=−60 dBm
  Current Noise Value=−45 dBm
μ=|Current Signal Strength−Average Signal Strength of 5 GHz|=|(−60)−(−55)|=5
π=|Current Signal Strength−Average Signal Strength of 2.4 GHz|=|(−60)−(−80)|=20
€=|Current Noise Value−Average Noise Value of 5 GHz|=|(−45)−(−95)|=50
£=|Current Noise Value−Average Noise Value of 2.4 GHz|=|(−45)−(−50)|=5
Here, 5<20, means (μ<π) and 50>5, means (€>£).
The result is (μ<π) && (€>£). The client device profile is not suited for connection to the 2.4 GHz band or the 5 GHz band. The client device will be connected to a band based on received signal strength.

Aspects of the present disclosure provide an improved apparatus method, and computer-readable recording medium of connecting the gateway device 2 to the client device 4 over the connection 9. Prior-art methods of steering the connection to the 2.4 GHz or 5 GHz Wi-Fi bands use centralized entities and/or databases to store information regarding client device capabilities and connection conditions. However, these methods generate substantial amounts of traffic between client devices and centralized entities and/or databases. These methods are also vulnerable to failures or connection issues with the centralized entities and/or databases. The present disclosure addresses these problems by establishing, referencing, and updating connection history tables 40 and client connection tables 50 at client devices 4 and gateway devices 2, respectively.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 5 and 6. For example, the one or more memories stores software or algorithms with executable instructions and the one or more processors can execute a set of instructions of the software or algorithms in association for providing monitoring and installation enhancements in any number of wireless networks in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

I claim:
1. An electronic device for use with one or more client devices for band steering, the electronic device comprising:
  a non-transitory memory configured to store a program;
  a communication interface configured to establish communication connections with the one or more client devices via a wireless network; and
  a processor configured to execute the program to:
  receive a request from a client device to connect to the wireless network;
  determine whether the request includes a connection history table stored in the client device;
  steer the client device to a first band implemented on the wireless network when it is determined that the request does not include the connection history table; and
  steer the client device to either the first band or a second band implemented on the wireless network when it is determined that the request includes the connection history table, the steering to either the first band or the second band being performed using connection data included in the connection history table, wherein the processor is further configured to execute the program to:

update the client connection history table after receiving a disconnect request from the client device and after the client device disconnects from the wireless network, and encrypt the updated connection history table, the encrypted and updated connection history table being stored in the client device.

2. The electronic device according to claim 1, wherein the first band is a 2.4 GHZ band and the second band is a 5 GHZ band.

3. The electronic device according to claim 1, wherein the connection data in the connection history table includes at least one of channel information, a history count, access time duration, noise values, and signal strength of the client device.

4. The electronic device according to claim 3, wherein the processor is further configured to execute the program to, when the processor steers the client device to either the first band or the second band:

determine whether congestion on the second band exceeds a predetermined threshold; and determine whether the connection data indicates a client profile suitable for connection to the first band or the second band.

5. The electronic device according to claim 4, wherein the client user profile is based on signal strength and noise values included with the connection data.

6. The electronic device according to claim 4, wherein the processor is further configured to execute the program to, when it is determined that the congestion on the second band exceeds the predetermined threshold:

determine a list of client devices already connected to the second band;

determine whether any of client devices on the list have exceeded an average access time duration on the second band; and move any of the client devices on the list that have exceeded the average access time duration on the second band to the first band.

7. The electronic device according to claim 5, wherein the processor is further configured to execute the program to, when it is initially determined that the client profile is not suitable for connection to either the first band or closer to the second band, steer the client device to either the first band or the second band based on signal strength.

8. A method of band steering in a wireless network, the method comprising:

receiving, using a processor, a request from a client device to connect to the wireless network;

determining, using the processor, whether the request includes a connection history table for the client device;

steering, using the processor, the client device to a first band implemented on the wireless network when it is determined that the request does not include the connection history table; and steering, using the processor, the client device to either the first band or a second band implemented on the wireless network when it is determined that the request includes the connection history table, the steering to either the first band or the second band being performed using connection data included in the connection history table, wherein the method further comprises:

updating, using the processor, the client connection history table after receiving a disconnect request from the client device and after the client device disconnects from the wireless network, and encrypting, using the processor, the updated connection history table, the encrypted and updated connection history table being stored in the client device.

9. The method of claim 8, wherein the first band is a 2.4 GHZ band and the second band is a 5 GHZ band.

10. The method of claim 8, wherein the connection history table, when included with the request, is encrypted, and the connection history table is decrypted by the processor after receiving the request from the client device.

11. The method of claim 8, wherein the connection data in the connection history table includes at least one of channel information, a history count, access time duration, noise values, and signal strength of the client device.

12. The method of claim 11, wherein the steering of the client device to either the first band or the second band further comprises:

determining, using the processor, whether congestion on the second band exceeds a predetermined threshold; and determining, using the processor, whether the connection data indicates a client profile suitable for connection to the first band or the second band.

13. The method of claim 12, wherein the client user profile is based on the signal strength and the noise values included with the connection data.

14. The method of clam 13, wherein, when it is determined that the congestion on the second band exceeds the predetermined threshold, the steering of the client device to either the first band or the second band further comprises:

determining, using the processor, a list of client devices already connected to the second band;

determining, using the processor, whether any of client devices on the list have exceeded an average access time duration on the second band; and moving, using the processor, any of the client devices on the list that have exceeded the average access time duration on the second band to the first band.

15. The method of claim 12, further comprising:

when it is initially determined that the client profile is not suitable for connection to either the first band or the second band, steering, using the processor, the client device to either the first band or the second band based on signal strength.

16. A non-transitory computer-readable recording medium having stored thereon one or more programs which when executed by a processor cause the processor to perform band steering comprising:

receiving a request from a client device to connect to a wireless network;

determining whether the request includes a connection history table for the client device; and steering the client device to a first band implemented on the wireless network when it is determined that the request does not include the connection history table; and steering the client device to either the first band or a second band implemented on the wireless network when it is determined that the request includes the connection history table, the steering to either the first band or the second band being performed using connection data included in the connection history table, wherein the processor is further configured to execute the one or more program to:

update the client connection history table after receiving a disconnect request from the client device and after the client device disconnects from the wireless network, and encrypt the updated connection history table, the encrypted and updated connection history table being stored in the client device.

17. The non-transitory computer-readable recording medium according to claim 16, wherein the steering of the client device to either the first band or the second band further comprises:

determining whether congestion on the second band exceeds a predetermined threshold; and determining whether the connection data indicates a client profile suitable for connection to the first band or the second band.

18. The non-transitory computer-readable recording medium according to claim 17, wherein the one or more programs when executed by a processor cause the processor to further perform at least: when it is determined that the congestion on the second band exceeds the predetermined threshold:

determining a list of client devices already connected to the second band; determining, whether any of client devices on the list have exceeded an average access time duration on the second band; and moving, any of the client devices on the list that have exceeded the average access time duration on the second band to the first band.

19. The non-transitory computer-readable recording medium according to claim 16, wherein the one or more programs when executed by a processor cause the processor to further perform at least:

when it is initially determined that the client profile is not suitable for connection to either the first band or the second band, steering the client device to either the first band or the second band based on signal strength.

* * * * *